United States Patent [19]

Masuda et al.

[11] Patent Number: 4,523,225
[45] Date of Patent: Jun. 11, 1985

[54] IMAGE DISPLAY APPARATUS

[75] Inventors: Mitsuya Masuda, Takatsuki; Sadahiro Iyehara, Suita; Shizuo Inohara, Toyonaka; Minoru Ueda, Takatsuki; Keisuke Yamamoto, Ibaraki; Yoshio Yasumoto, Higashiosaka, all of Japan

[73] Assignee: Matsushita Electric Industrial Co., Ltd., Kadoma, Japan

[21] Appl. No.: 494,311

[22] Filed: May 13, 1983

[30] Foreign Application Priority Data

May 13, 1982 [JP] Japan .................................. 57-80902
May 17, 1982 [JP] Japan .................................. 57-83446

[51] Int. Cl.³ .............................................. H04N 5/66
[52] U.S. Cl. ...................................... 358/56; 358/230; 315/366; 313/422
[58] Field of Search ........................ 358/56, 59, 64, 74, 358/66, 230, 231, 240, 241, 242; 313/409, 411, 413, 414, 422, 497; 315/366, 169 TV, 169 R

[56] References Cited

U.S. PATENT DOCUMENTS 4,449,148  5/1984  Inohara ................................ 358/56
4,451,846  5/1984  Iyehara ................................ 358/56
4,451,852  5/1984  Musuda ................................ 358/56

FOREIGN PATENT DOCUMENTS 57-135590  8/1982  Japan .

Primary Examiner—Michael A. Masinick
Attorney, Agent, or Firm—Cushman, Darby & Cushman

[57] ABSTRACT

A flat CRT type image display apparatus comprises a number of horizontally disposed parallel line cathodes and vertical and horizontal deflection means, and electron beams control means, and the deflection means includes digital memory means storing data for deflection signals, address counter means for producing address signal to read out the digital memory means, D/A converters for converting read out data to produce deflection signals and also a microcomputer for setting and adjusting data in the digital memory means.

4 Claims, 20 Drawing Figures

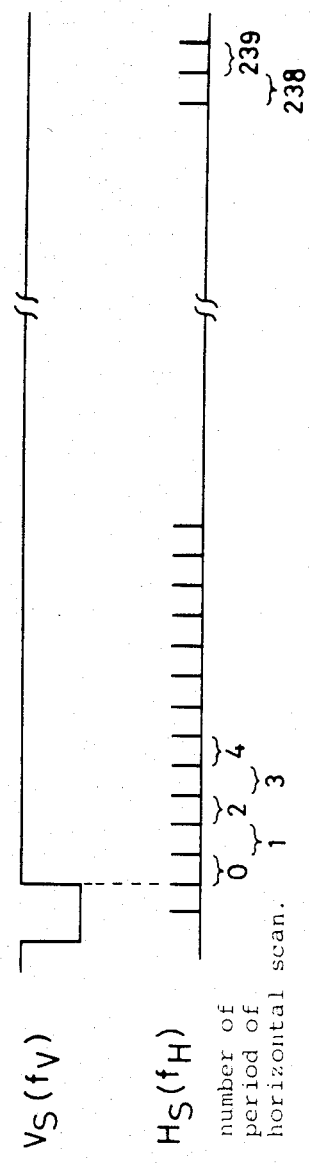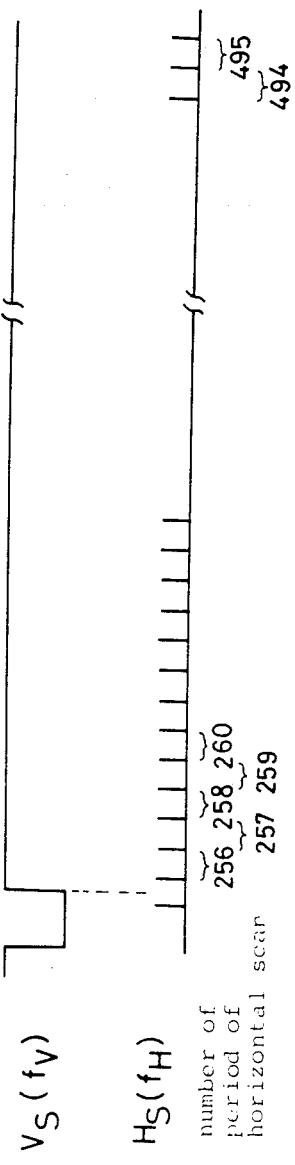

FIG. 8(A)
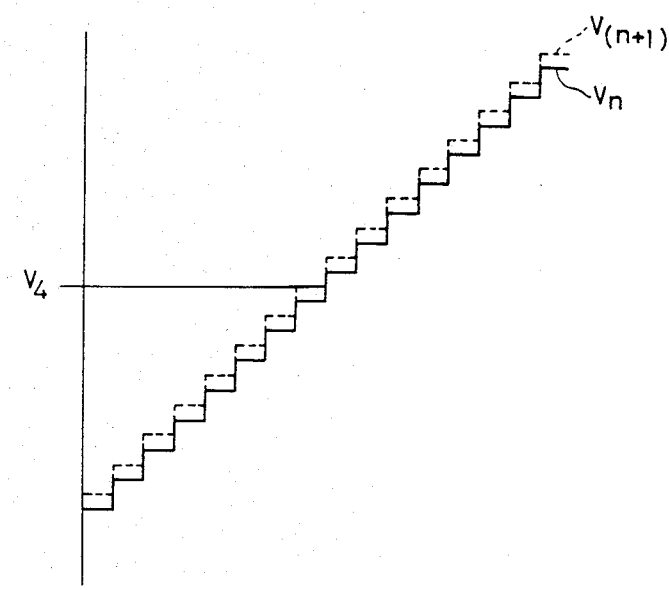
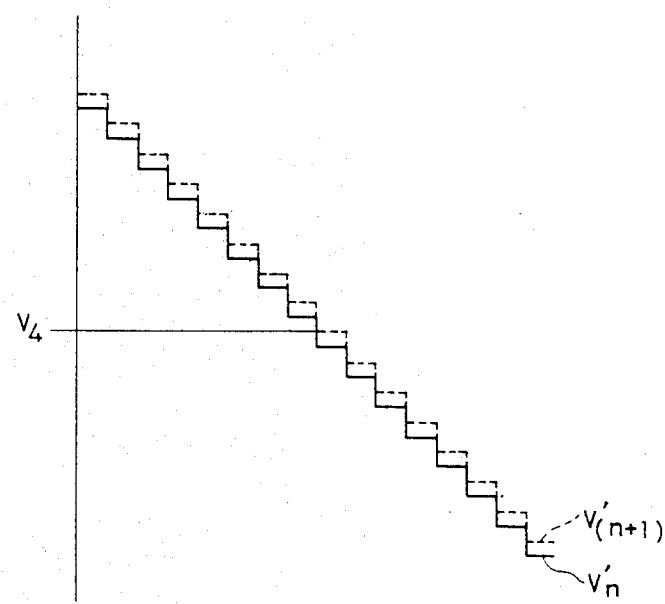

lines of odd number field lines of even number field

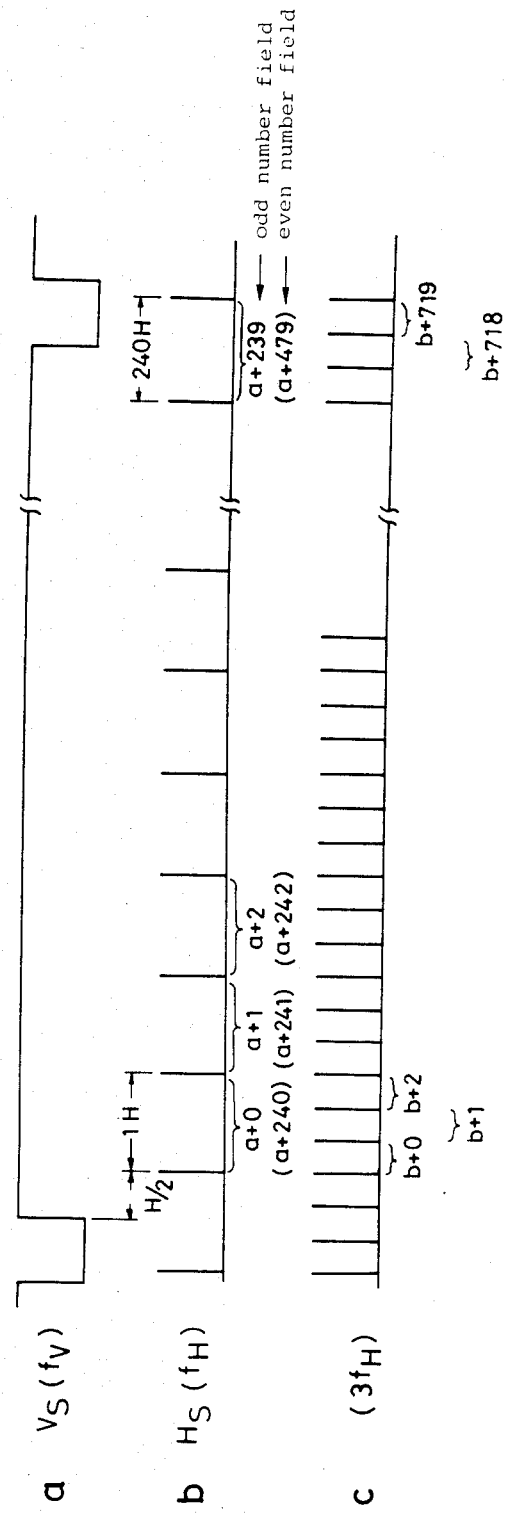

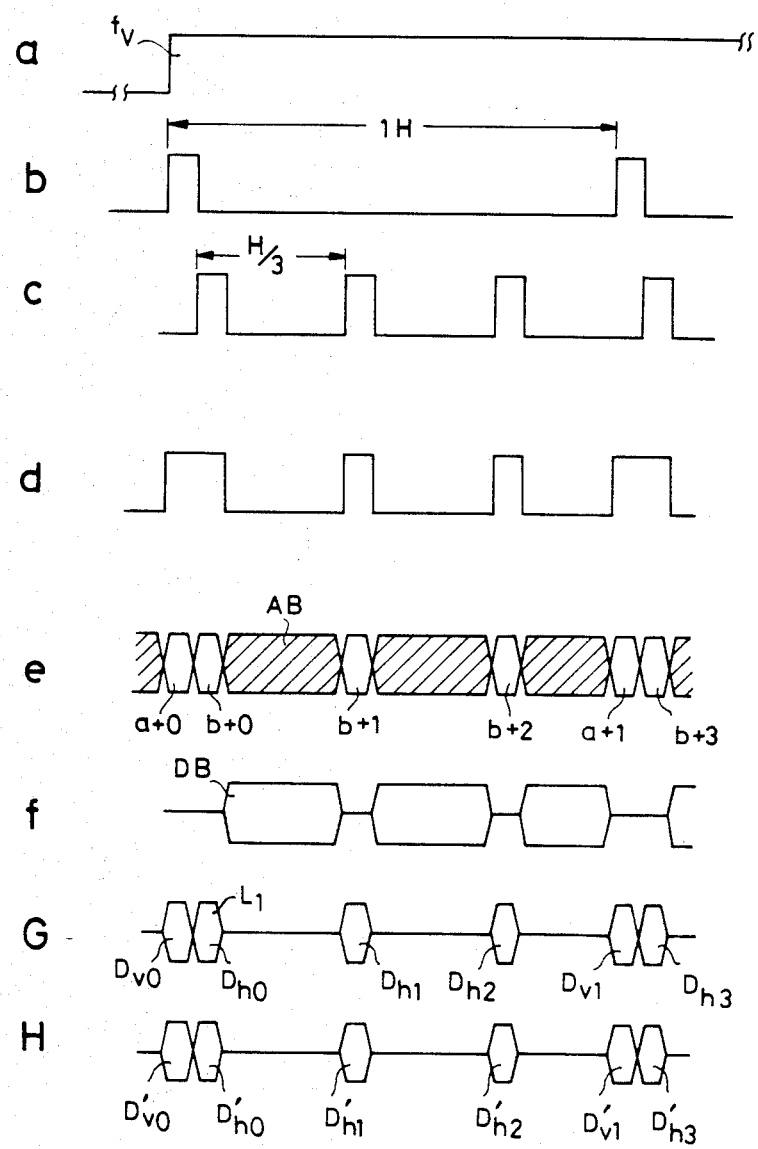

IMAGE DISPLAY APPARATUS

BACKGROUND OF THE INVENTION

1. Field of the Invention

The present invention relates to an image display apparatus comprising a flat displaying apparatus with a number of (for example fifteen) line cathodes.

More particularly, the present invention concerns an image display apparatus for displaying image by means of a phosphor screen and a plural number of parallel disposed line cathodes wherein deflections of electron beams are controlled by means of digitally processed deflection signals.

2. Description of the Prior Art

Hitherto, for an image display apparatus for a television set, a cathode-ray tube having a single electron gun or, three electron guns set in a neck part of a bulky cone shaped vacuum enclosure has been used for long time. The shortcoming of the conventional cathode ray tube is a large depth in comparison with the size of the screen face, disabling to provide a flat and compact television set. Though EL display apparatus, plasma display apparatus or liquid crystal display apparatus has been developed, these are not sufficiently usable for practical use because they have problems in brightness, contrast or color displaying.

As a novel flat type image display apparatus using electron beams, the applicant proposed an invention in a senior Japanese Patent Application Sho 56-20618 (published in the Japanese un-examined Patent Application Sho 57-135590 which was published only after the priority date of the present case). The art of the senior application is a color display apparatus comprising:

a color phosphor screen comprising a first predetermined number of horizontally divided sections each comprising a set of regions of primary color phosphors, an electron beam source for in-turn emitting a second predetermined number of horizontal rows of electron beams, each row having the first predetermined number of electron beams, producing one horizontal line on the color screen, a horizontal deflection means for selective impingements of the electron beams on the regions in turn selected corresponding kinds of primary color phosphors at one time, in turn changing colors of the horizontally divided sections, a vertical deflection means for vertically deflecting the electron beams in such a manner that electron beams of a horizontal row impinges the phosphor screen in one vertically divided segment which is corresponding to the one horizontal row, thereby vertically moving the one horizontal line in the vertically divided segment, an electron beam control means for simultaneous controlling of intensities of respective electron beams responding to color video signal for the selected kind of primary color to produce a line-at-a-time displaying of color video picture, and a flat shaped vacuum enclosure containing the above-mentioned components therein, one end face thereof forming a screen face in which the color phosphor screen is provided.

SUMMARY OF THE INVENTION

The present invention is intended to provide a television set or the like appliance with a flat shaped display apparatus.

The present invention enables to display monochromatic or color image of a high quality with uniformly disposed horizontal scanning lines and capable of operating good interlace scanning.

Moreover, the present invention enables easy and free adjustments of horizontal scanning signal and vertical scanning signal.

The display apparatus in accordance with the present invention comprises:

a phosphor screen comprising a first predetermined number of horizontally divided sections, a second predetermined number of an electron beam sources for in-turn emitting a second predetermined number of horizontal rows of electron beams, each row having the first predetermined number of electron beams, producing one horizontal line on the screen, horizontal deflection means for selective impingements of the electron beams on the regions of in-turn selected corresponding positions of the horizontally divided sections at one time, vertical deflection means for vertically deflecting the electron beams in such a manner that electron beams of a horizontal row impinges the phosphor screen in one vertically divided segment which is corresponding to the one horizontal row, thereby vertically moving the one horizontal line in the vertically divided segment, electron beam control means for simultaneous controlling of intensities of respective electron beams responding to image signal to produce a line-at-a-time displaying of video picture, a flat shaped vacuum enclosure containing the above-mentioned components therein, one end face thereof forming a screen face in which the phosphor screen is provided, wherein the horizontal deflection means and the vertical deflection means comprises:

digital memory means which stores data of digital deflection signals for deflections of the electron beam, D/A converters for converting the digital deflection signals into analog signals, and address counters for controlling the digital memory means, the digital memory means comprising first memory means which stores data of the digital deflection signals for odd number field and second memory means which stores data of the digital deflection signals for even number field, the address counters issuing different address signals for odd number field and even number field, thereby to make accessing to the first memory means and the second memory means for the odd number field and the even number field, respectively.

In order to provide the above-mentioned, at least for producing vertical deflection signal, a digital memory and a counter which counts horizontal synchronization signal, means to feed output of the counter to the address input of the above-mentioned digital memory, means to output data corresponding to the addresses of the digital memory, and D/A converter for converting said digital data from the memory into analog deflection signal are provided. By using the digital technique and storing data for odd number field deflection signal and even number field deflection signal in the memory, a very accurate interlacing is assured. At the same time with the vertical deflection signal, the horizontal deflection signal can be produced in the same art. And the deflection signals can be easily and freely adjusted by rewriting the data in the memory by using a microprocessor.

Operating circuit and details of deflection electrodes are deviced so as to obtain satisfactory displaying of video images, and these devicings are explained in detail referring to the accompanying drawing.

BRIEF EXPLANATION OF THE DRAWING

FIG. 7(A) and FIG. 7(B) are waveform charts of the circuit of FIG. 5.

FIG. 8(A) is a waveform chart of the circuit of FIG. 5.

FIG.11(A), FIG. 11(B), FIG. 12, FIG. 13 and FIG. 14 are waveform charts for explaining operation of the circuit of FIG. 9.

DESCRIPTION OF THE PREFERRED EMBODIMENTS

Figure 1:
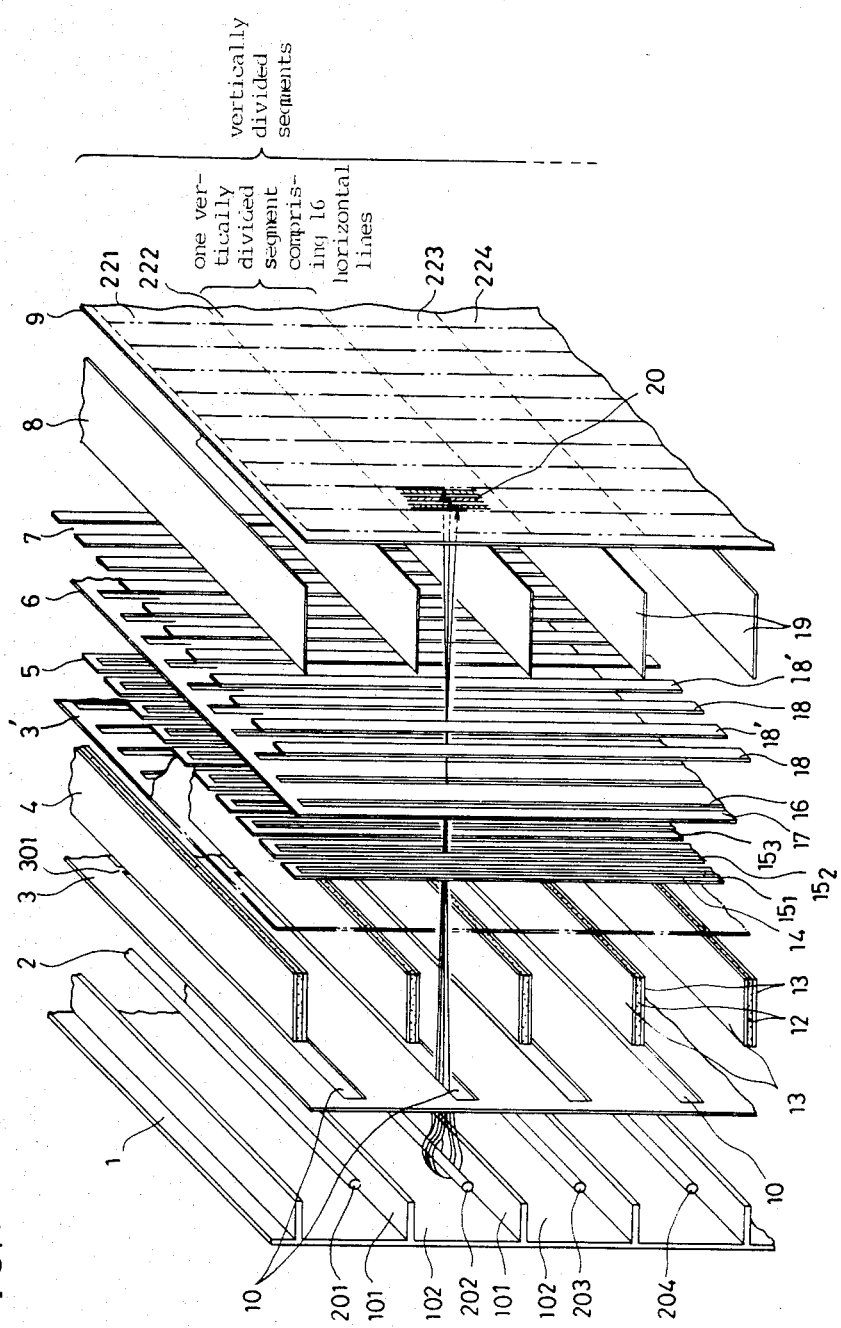
FIG. 1 is an exploded perspective view of a principal part, with its vacuum enclosure removed, of a video image display apparatus embodying the present invention, expanded of its size in the horizontal direction enlarged in comparison with the vertical direction for easier drawing of minute constructions.

One preferred example of the present invention is shown in FIG. 1, wherein from the back part to front part the following components are provided in a flat box-shaped evacuated envelope not shown here, but preferably made of glass:

a back electrode 1 having horizontal isolation walls 101, 101 . . . projecting perpendicularly therefrom forming isolated spaces 102, 102 . . . therein, a row of a predetermined number (e.g. 15 in this embodiment) of horizontal line cathodes 201, 202, . . . disposed substantially horizontally in the isolated spaces 102, 102 . . . , a vertical beam-focussing electrode 3 having the predetermined number (e.g. 15 in this embodiment) of horizontal slits 10, a first vertical deflection means 4 comprising the predetermined number of pair of vertical deflection electrodes 13', 13 . . . , held by insulator board 12. Each pair of vertical deflection electrodes comprises an upper electrode 13 and a lower electrode 13' both disposed substantially horizontal and defining a deflection space inbetween disposed before the corresponding horizontal slit 10, a second vertical beam-focussing electrode 3' substantially similar to the horizontal beam-focussing electrode 6, a predetermined large number (e.g. 320 for this embodiment) of beam control electrodes 5 consisting of vertical strip electrodes $15_1$, $15_2$ . . . $15_{320}$ each having beam-passing slits 14, 14 . . . disposed with uniform pitch, a horizontal beam-focussing electrode 6 having the predetermined number (e.g. 320 for this embodiment) of vertical slits at positions in front of the slits 14,14, . . . of the beam control electrodes 5, 5 . . . , a horizontal deflection means 7 comprising the predetermined number (e.g. 320 for this example) of vertical strip electrodes 18, 18', 18, 18' . . . defining the predetermined number (e.g. 320 for this example) of vertically oblong deflection gaps inbetween, a beam acceleration means 8 consisting of a set of horizontally disposed electrodes 19, 19 . . . , and finally a phosphor screen 9, which is ordinarily provided on the inner wall of a front face of the enclosure.

The line cathodes 201, 202 . . . form electron beam source 2, wherein horizontal line cathodes are disposed forming a vertical row, with substantially uniform gaps with each other. In this example, as above-mentioned 15 line cathodes 201, 202 . . . 215 are provided, but only four of them are shown. The line cathodes are made by coating a tungsten wire of, for example, 10–20 μm diameter with known electron emitting cathode oxide. All the line cathodes are heated by feeding current thereto, and selective in-turn taking out of horizontal sheet shaped electron beam from selected one of the line cathode is done by changing a potential of the in-turn selected line cathode to negative with respect to the potential of the focussing electrode 3.

The back electrode 1 serves to suppress emissions of electrons from other line cathodes than the selected one and also expel the electrons from the selected cathode to its front direction. The back electrode 1 may be formed by attaching conductive substance such as conductive paint on the inner wall of the back face of the flat type vacuum enclosure. A flat plane shaped cathode may be used in place of the row of the line electrode 201, 202 . . .

The first vertical beam-focussing electrode 3 have the slits 10 at the position to face the line cathodes 201, 202 . . . and is impressed with a DC voltage, therefore horizontal sheet shaped electron beam from a selected line cathode is formed. The sheet shaped electron beam is then divided into a large number (e.g. 320 in this example) of narrow electron beams by passing through the second vertical beam-focussing electrode 3', the control electrode 5 and horizontal focussing electrode 6. In FIG. 1, only one such narrow electron beam is shown for simplicity. Each slit 10 may have supporting ribs in midway part of the length, or further may consists of a large number (e.g. 320) of openings with very narrow rib parts 301 inbetween.

The electrodes 13, 13' of the vertical deflection means 4 are disposed at levels of substantially the centers between vertically neighboring two horizontal slits 10, 10 of the vertical focussing electrode 3, and a lower electrode 13 and an upper electrode 13' are held on both faces (upper and lower faces) of an insulation board 12. A changing voltage (a vertical deflection signal) is impressed across the pair of upper electrode and lower electrode of each pair thereby forming changing electric field for vertical deflection. In this example, as has been elucidated, by impressing the 16-step changing voltage across the pair electrodes, each electron beam is deflected in a manner to have 16 levels. And the same matter takes place in each of 15 vertically divided segments $22_1, 22_2, 22_3 \ldots 23_5$ on the phosphor screen. Accordingly, the phosphor screen 9 has 240 horizontal lines in total (16 lines×15 segments=240 lines).

The beam control electrodes 5 comprising 320 strip electrodes $15_1, 15_2 \ldots 15_{320}$ together with the horizontal beam-focussing electrode 6 divide the horizontal sheet shaped electron beam into 320 rod shaped electron beams, and each strip electrodes $15_1, 15_2 \ldots 15_{320}$ of the beam control electrodes 5 control intensities of the rod shaped electron beams responding to the information of the video signal. Therefore, the 320 strip electrodes control information of 320 picture elements on each horizontal line. The 320 beam control electrodes receive 320 control signals respectively and controls the 320 rod beams in such a manner as, at one time for red color irradiation, at one time for green color irradiation and at one time for blue color irradiation, in turn. In order to display color picture on the color phosphor screen with the control signals applied to the beam control electrodes, each picture element comprises three elementary color regions, namely red strip region, green strip region and blue strip region, which are disposed in horizontal direction.

The feature of the present embodiment is that all the 320 beam control electrodes $15_1, 15_2 \ldots 15_{320}$ receive the beam control signals for displaying respective three primary colors, i.e., red and blue or green, at a same time. That is, at one moment, one horizontal line on the phosphor screen displays an image of red color parts and blue color parts of the line by impingements of red phosphor regions by odd number electron beams and impingements of blue phosphor regions by even number electron beams, at the next moment an image of green color part of the line, and at the next moment an image of red color parts and blue color part of the line by impingements of red color phosphors regions by even number electron beams and impingements of blue color phosphor regions by odd number electron beams. In this apparatus, the odd number electronic switches $35_1, 35_3, 35_5 \ldots 35_{15}$ switch to feed signal in the order of R, G and B, and the even number electronic switches $35_2, 35_4 \ldots 35_{14}$ switch in the order of B, G and R.

The horizontal beam-focussing electrode 6 is impressed with a DC voltage and focusses the rod shaped electron beams in horizontal direction.

The horizontal deflection means 7 comprises strip electrodes 18, 18' ... which are disposed at the positions in front of center positions between neighboring slits 16, 16 of the horizontal beam-focussing electrode 6. Each of the strip electrodes pair 18, 18' is impressed with 3-level changing voltage or a horizontal deflection signal, and horizontally deflects rod shaped electron beams, thereby making the rod shaped electron beams selectively impinge red phosphor regions, green phosphor regions or blue phosphor regions in turn.

In the example, where a horizontal row of 320 rod shaped electron beams impinge 320 sets of three primary color regions, one horizontal deflection range corresponds to one horizontal picture element width.

The horizontally disposed electrodes of the beam-acceleration means 8 are dispose at the height level corresponding to those of the composite body of vertical deflection electrodes 13 and 13' and are impressed with a DC voltage.

The phosphor screen 9 may be provided with known metal back layer (not shown) formed on the side of cathodes and a positive DC voltage is impressed thereon. In practical example, the phosphor regions are formed vertically oblong strips of red color phosphor, green color phosphor and blue color phosphor. In FIG. 1, horizontal broken lines on the phosphor screen 9 show boundary lines between neighboring vertically divided segments to be impinged by electron beams of respective line cathodes. Vertical chain lines on the phosphor screen 9 shown boundary lines between horizontally neighboring sets of three primary color phosphor strips.

Figure 2:
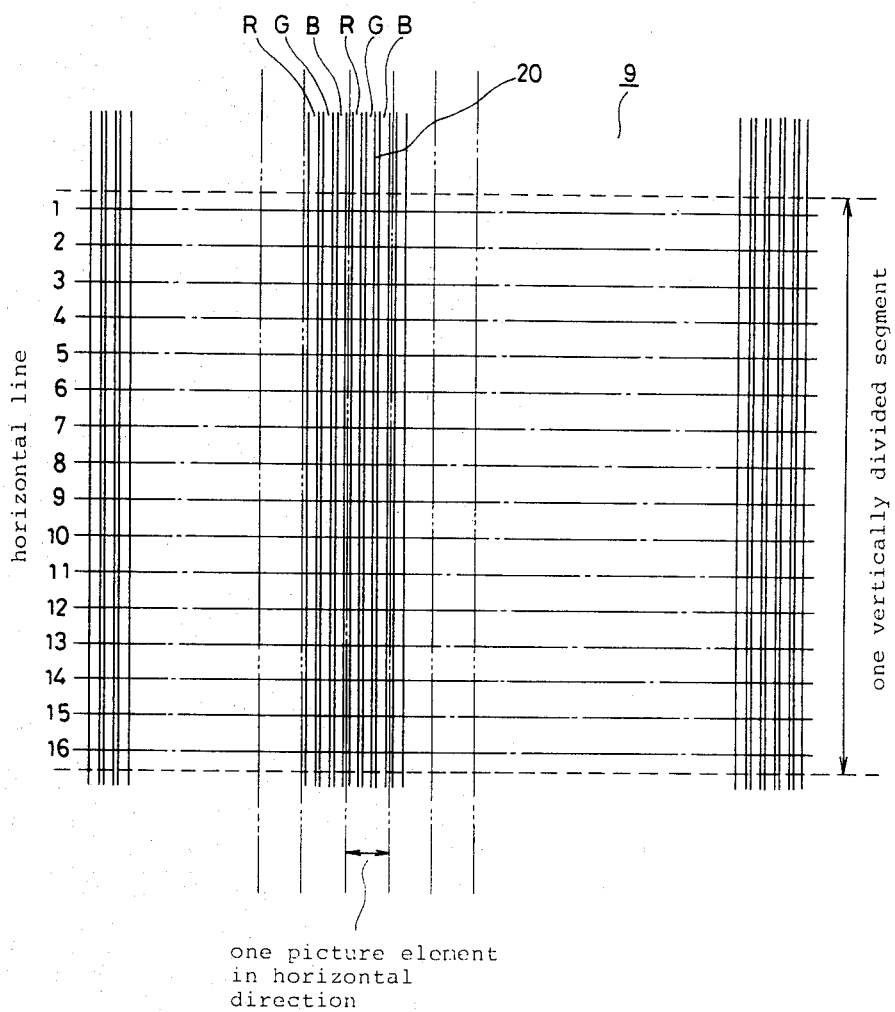
FIG. 2 is a schematic front view of a phosphor screen of the apparatus of FIG. 1.

A small segment 20, which is defined by two neighboring vertical chain lines and two neighboring horizontal broken lines, is shown enlarged in schematic view of FIG. 2, wherein the small segment 20 has 16 horizontal lines in vertical row. In an actual example, one segment has the size of 16 mm high in vertical direction and 1 mm width in horizontal direction, and in FIG. 1 the sizes are shown enlarged in widthwise direction as has been mentioned.

Apart from the above-mentioned example where 320 sets of three primary color phosphor regions are formed widthwise of the phosphor screen for 320 rod shaped electron beams produced by 320 slits 14 of the beam-control electrode 5 and 320 slits 16 of the horizontal beam-focussing electrode 6, such a modification may be made that for the 320 sets of three primary color phosphor regions, 160 rod-shaped electron beams are provided, and in this case the horizontal deflection signal is 6-level changing voltage which deflects the rod-shaped electron beam to sweep for the horizontal range of the color phosphor regions of RGBRGB, and each of the beam-control electrodes 5 also receives the control signal for two picture elements in sequence.

Figure 3:
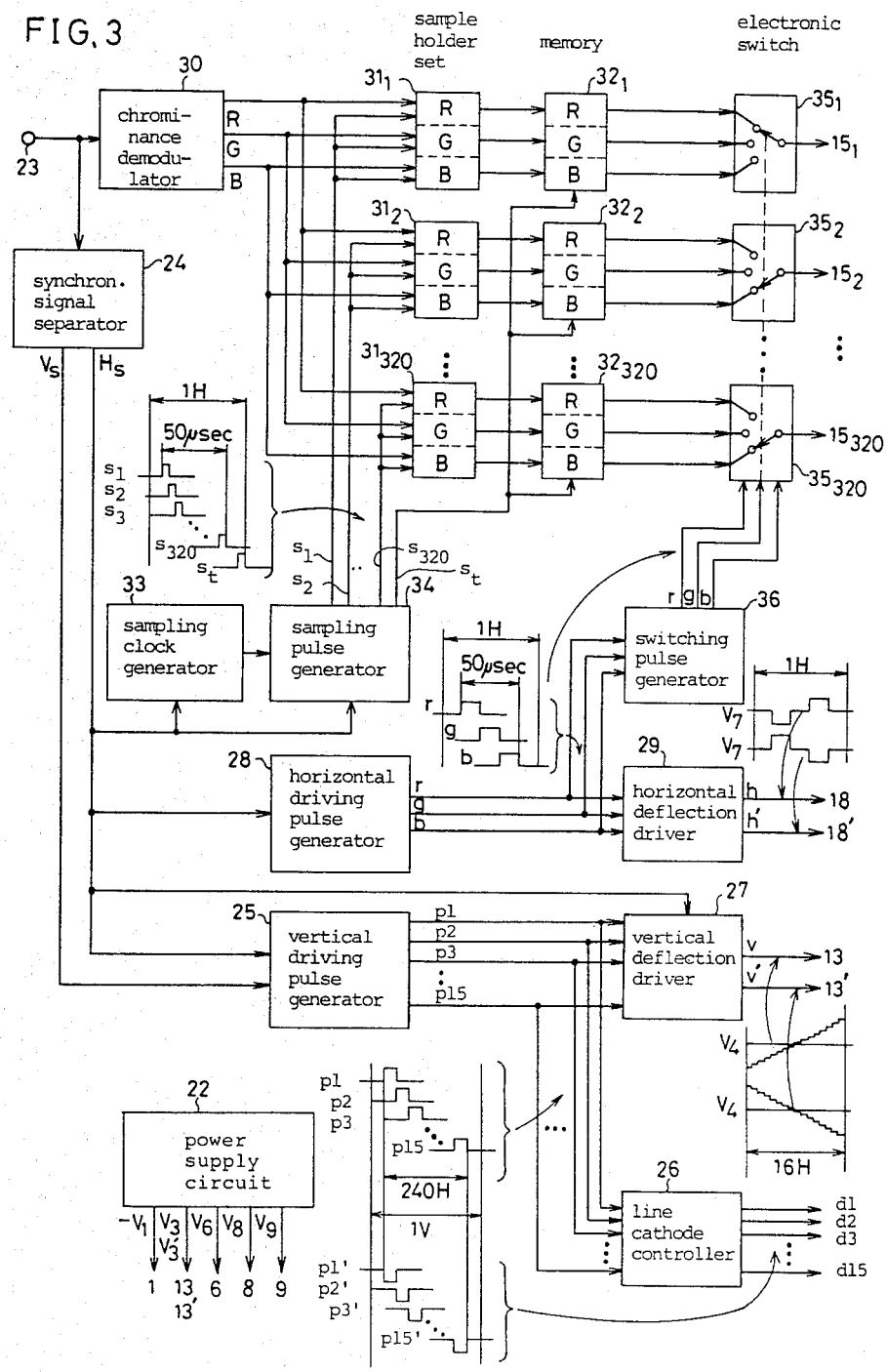
FIG. 3 is a circuit block diagram showing a fundamental electric construction of the apparatus of FIG. 1.

FIG. 3 shows a circuit block diagram of a fundamental electric construction of the apparatus of FIG. 1. The explanation starts from the part to drive tne cathode ray tube to form a raster on its phosphor screen.

A power supply 22 is for impressing necessary voltages on various electrodes of the flat cathode ray tube of FIG. 1. The following DC voltages are supplied to the electrodes:

| | | |
|---|---|---|
| $-V_1$ | to | back electrode 1, |
| $V_3$ | to | vertical beam-focussing electrode 3, |
| $V_3'$ | to | vertical beam-focussing electrode 3', |
| $V_6$ | to | horizontal beam-focussing electrode 6, |
| $V_8$ | to | acceleration electrode 8, |
| $V_9$ | to | phosphor screen 9. |

An input terminal 23 receives ordinary composite video signal and give it to a synchronizing signal separator 24 and to a chrominance demodulator 30. The synchronizing signal separator 24 separate and issues vertical synchronizing signal $V_s$ and horizontal synchronizing signal $H_s$. A vertical driving pulse generator 25 comprises a counter which count the horizontal synchronizing signal $H_s$ and is reset by the vertical synchronizing signal $V_s$, and issues 15 driving pulses p1, p2, p3 ... p15, each having duty time of 16H (1H is the time period for one horizontal scanning). The fifteen pulses p1 to p15 are issued during an effective vertical sweep period, which is the time length of one vertical sweep period exclusive of vertical fly-back time and is of 240H time length. The driving pulses are then given to the line cathode controller 26, where they are inversed of polarity to produce pulses p1', p2', p3' . . . p15' falling down to OV at respective inversed peak period (of 16H length) and retaining 20 V for other period, and is fed to respective line cathodes 201, 202, 203 . . . 215. The line cathodes are always heated by a small voltage DC current so as to be able to emit electrons at any time, and the electrons are taken out, when the pulse of a selected line cathode is at its peak (OV), by means of positive electric field towards the vertical beam-focussing electrode 3 and subsequent other electrodes. For period other than the peak (OV) of the pulses impressed on a line cathode, because of negative electric field formed by impression of +20 V thereon, the line cathodes do not emit electron beam. That is, one of the 15 line cathodes in turn emit electrons beams. Therefore, the line cathodes are activated in turn from the top one 201 to the bottom one 215 each for 16H time period. The emitted electrons are driven forward to the vertical beam-focussing electrodes 3, 3' and focussed to form a horizontal sheet-shaped electron beam.

A vertical deflection driver 27 comprises a counter for counting horizontal synchronizing signal $H_s$ and is reset by the output pulses p1, p2 . . . p15 of the vertical driving pulse generator 25 and an A/D converter for A/D converting the count output. And the vertical deflection driver 27 issues a pair of vertical deflection signals v, v', which are 16-step rising sawtooth wave and 16-step falling sawtooth wave, respectively, both having center voltage of $V_4$. These vertical deflection signals V and v' are impressed on the upper vertical deflection electrodes 13 and the lower vertical deflection electrodes, respectively. Accordingly, the sheet shaped electron beams are vertically stepwisely deflected in 16 steps and repeat the same. And therefore, a horizontal line displayed on the phosphor screen stepwisely falls from top position to bottom position in 16 steps in one vertically divided segment 221, 222 . . . or 235 of FIG. 1.

Since the activation of the line cathodes is stepwisely shifted one by one downward every 16H time period, when the horizontal line on the phosphor screen comes down and arrives at the bottom of the first vertically divided segment 221, the next moving of the horizontal line on the phosphor screen starts from the top position of the second vertically divided segment 222, and the similar downward shifting of the horizontal line proceeds until the horizontal line arrives at the bottom of the 15th (lowest) vertically divided segment 235, and the horizontal line goes back to the top of the first segment 221. That is, the vertical deflection of the horizontal line continuously proceeds from the top (No. 1 horizontal line) to the bottom (No. 240, i.e., (15×16)th) of the phosphor screen 9, thereby forming a raster of 240 horizontal lines.

The sheet-shaped electron beam is then divided into 320 rod-shaped electron beams having substantially round sections when passing through the vertically oblong slits 14, 14 . . . of the beam-control electrode $15_1$, $15_2$ . . . and vertically oblong slits 16, 16 . . . of the horizontal beam-focussing electrode 6. The rod-shaped electron beams are controlled of their currents by means of voltage impressed on respective strip electrodes of the beam-control means 5, and further deflected by horizontal deflection means 7 so as to have one of three positions corresponding to R, G and B regions of the phosphor screen 9 by means of the horizontal deflection signals given by the horizontal deflection driver 29.

A horizontal driving pulse generator 28 comprises three stages of sequentially connected monostable multivibrators, the first stages of which is triggered by horizontal synchronizing signal $H_s$. And the horizontal driving pulse generator issues three pulses r, g and b of the same pulse widths. For one example, an effective horizontal scanning period of $50\mu$ sec. is divided into 3 periods for the pulses r, g and b, accordingly, the pulses, r, g and b have $16.7\mu$ sec. pulse width each. The horizontal driving pulses r, g and b are given to the horizontal deflection driver 29, which is switched by the horizontal driving pulses r, g and b and issues a pair of horizontal deflection signals h and h'. These horizontal deflection signals h and h' are three step rising signal and three step falling signal, respectively, and, both have the same center voltage $V_7$. These horizontal deflection signals h and h' are given to the horizontal deflection electrodes 18, 18, 18 . . . and 18', 18', 18' . . . dispose alternately in the horizontal deflection means 7. As a result, 320 rod-shaped electron beams are deflected at the same time to R, G or B regions on a same horizontal line of the phosphor screen.

It should be noted that in the construction shown in and elucidated referring to FIG. 1, the number of strip electrodes 18, 18' . . . of the horizontal electrodes are 320 for the 320 rod-shaped electron beams, and the strip electrodes 18, 18' . . . are alternately connected to the output terminals h and h' of the horizontal deflection driver. Accordingly, the electric fields of horizontal deflection gaps defined by neighboring two strip electrodes 18 and 18' are not of the same direction. Namely, the directions of electric field of the horizontal deflection gaps are alternatingly opposite each other for neighboring horizontal deflection gaps. The effect of this alternatingly opposite electric field is compensated as will be elucidated later.

Thus, the horizontal line on the phosphor screen at one time displays red image at the same time, at the next time green image at the same time and at the next time blue image at the same time, and at the next time the line proceed to the next lower line whereon the same is repeated.

The beam intensity control is made as follows:

The input composite video signal received at the input terminal 23 is given to the chrominance demodulator 30 where color differential signals R-Y and B-Y are demodulated and G-Y is also produced by known matrix circuit therein, and by processing these color differential signals with a luminance signal Y, primary color signals R, G and B are produced. The primary color signals R, G and B are given to 320 sets of sample-hold means $31_1$, $31_2$ . . . $31_{320}$, each comprising three elementary sample-hold circuits for R, G and B color signals. The output signals of the 960 elementary sample-hold circuits are given to 320 sets of memory means $32_1$, $32_2$ . . . $32_{320}$, each comprising three memories for R, G and B color signals.

On the other hand a sampling clock generator 33 comprises PLL (phase locked loop) circuit, and issues sampling clock pulses of 6.4 MHz, which is controlled to have a predetermined phase difference against the horizontal synchronizing signal $H_s$. The sampling clock pulses are given to the sampling pulse generator 34, wherein by means of, for example, a shift register of 320 stages, 320 sampling pulses $S_1, S_2 \ldots S_{320}$, each having phase difference by $50\mu$ sec/320 time inbetween, are produced and given to the sample hold circuits $31_1, 31_2 \ldots 31_{320}$, respectively. After the last sampling pulse $S_{320}$, a transferring pulse $S_t$ is issued from the sampling pulse generator 34 to the memories $32_1, 32_2 \ldots 32_{320}$. The sampling pulses $S_1, S_2 \ldots S_{320}$ correspond to 320 picture elements in the horizontal direction on the phosphor screen 9, and their timings are controlled so as to have a constant relation with respect to the horizontal synchronizing signal $H_s$. By impressing the 320 sets of sampling pulses to respective 320 sets of sample-hold circuits, the sample-hold circuits $31_1, 31_2 \ldots 31_{320}$ sample and hold R, G and B information of video signals therein. After finishing of the sample-hold for one horizontal line, upon receipt of the transfer signal $S_t$ by the memories, the sample-held informations are transferred at one time to the memories $32_1, 32_2 \ldots 32_{320}$, and retained there for the next one horizontal scanning period ($H=63.5\mu$ sec).

The R, G and B information of the video signal for the one horizontal line stored in the memories $32_1, 32_2 \ldots 32_{320}$ are led to 320 electronic switches $35_1, 35_2 \ldots 35_{320}$, which are electronics switches comprising analog gate circuits for selectively leading the stored signals of a color R, G or B to the respective strip electrodes $15_1, 15_2 \ldots 15_{320}$ of the beam control means 5. The switching circuits $35_1, 35_2 \ldots 35_{320}$ are simultaneously switched, being controlled by switching pulses given from a switching pulse generator 36, which is controlled by the output pulses r, g and b of the horizontal driving pulse generator 28. The electronic switches $35_1, 35_2 \ldots 35_{320}$ switch every $16.7\mu$ sec ($=50\mu$ sec/3) for selectively leading the video signal information of R, G and B color in turn each for $16.7\mu$ sec.

In the switching, the switching circuits of the odd number orders are switched in the order of R→G→B while the switching circuits of the even number orders are switched in the order of B→G→R, so that the effect of the alternatingly opposite directed electric fields produced by the horizontal deflection means 7 is compensated.

Hereupon it should be noted that timing (phases) of the switchings of the electronic switches $35_1, 35_2 \ldots 35_{320}$ and the horizontal deflection driver 29 should be completely synchronized with each other, in order to avoid poor color impurity caused by undesirable mixing of a color signal with other color signals.

As a result of the operation as has been elucidated, the phosphor screen displays red color image of one horizontal line at one time, followed by green color image of the horizontal line at one time and further followed by blue color image of the horizontal line at one time, and then the same displaying is made proceeding to the next (lower) line, and thus displaying of one field having 240 horizontal lines is completed. And the displayings of the fields are repeated and television picture is obtainable on the phosphor screen 9.

In case the number of picture elements on one horizontal line is selected twice or three times of the number of rod shape electron-beams each individually controlled by independent beam control electrodes $15_1, 15_2, \ldots$ the number of the above-mentioned sample-hold circuits must be increased twice or three times, to the number of the picture elements on the line, and relevantly, the numbers of the memories should also be increased to the same number. And each electronic switch should selectively connect the outputs of the increased number of memories time sharingly to the corresponding beam-control electrodes.

The primary colors of the phosphor regions are not necessarily limited to the combination of the R, G and B, but any other combination as the primary color of phosphors may be usable.

In the above-mentioned description, the words "horizontal" and "vertical" are used to imply that "horizontal" is the direction that the lines are displayed on the phosphor screen, and "vertical" is the direction that the displayed line is shifted to the next line to form a raster, and accordingly these words are not bound to the absolute spatial relation of the screen.

The above-mentioned apparatus can provide a color television apparatus of very flat and compact type, and a sufficiently bright and clean display image is ensured since known combination of the color phosphors and cathode ray beams is used.

Figure 4:
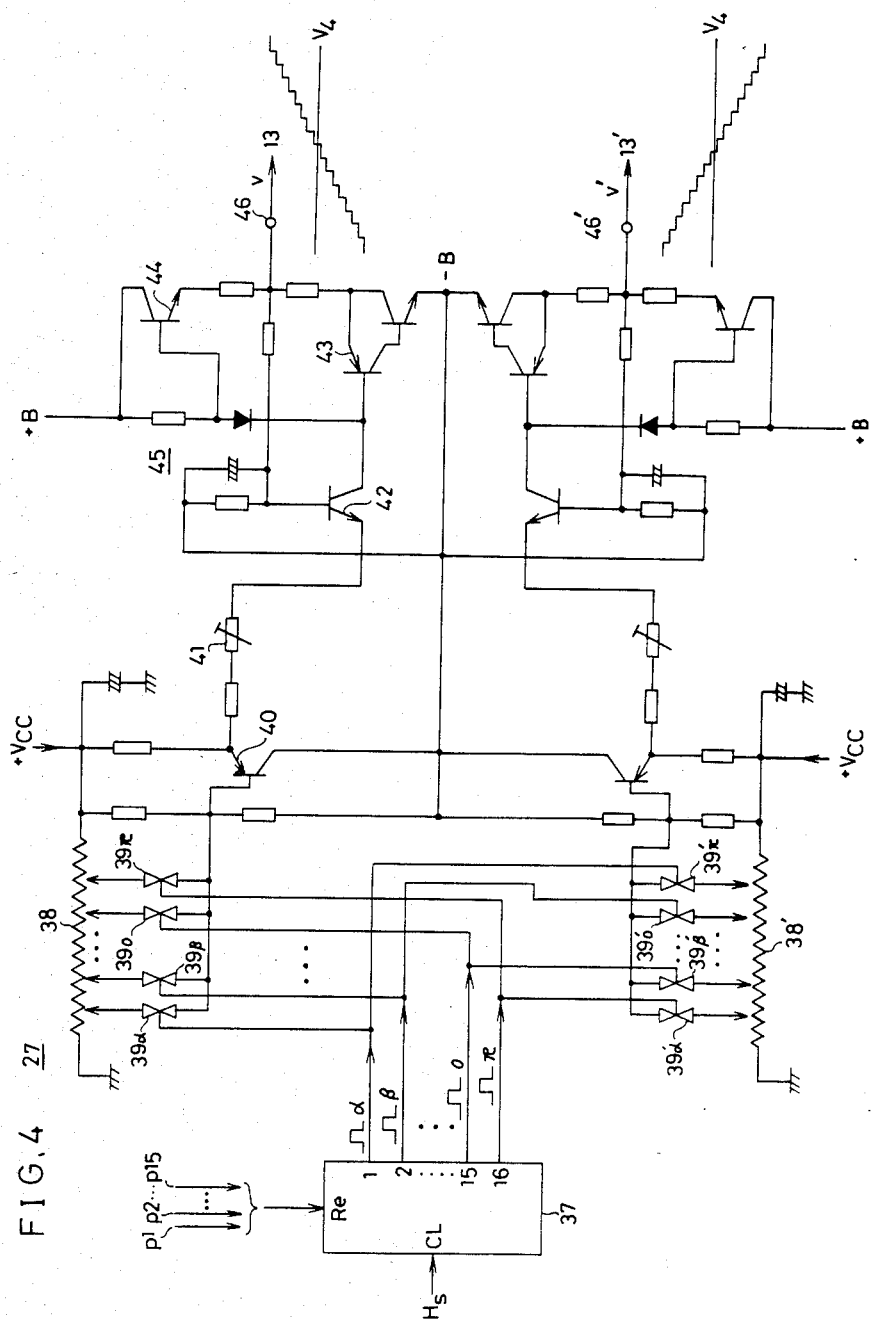
FIG. 4 is a fundamental circuit diagram showing an analog type example of a vertical deflection driver 27.

FIG. 4 shows a representative example of an analog type vertical deflection driver 27, which is an inventors' not yet disclosed prior art. A ring-counter 37 is reset by rise edges of the vertical driving pulses $p_1, p_2 \ldots p_{15}$ from the vertical driving pulse generator 25, counts the horizontal synchronizint signals $H_S$ and issues output signals $\alpha, \beta, \gamma \ldots o$ and $\pi$ from its 16 output terminals. On the other hand, a potentiometer 38 has 16 intermediate output terminals, through which 16 output voltages of different levels are taken out and given to the analog switches $39_\alpha, 39_\beta \ldots 39_\pi$, respectively. These analog switches are controlled by the above-mentioned signals $\alpha, \beta, \gamma \ldots \pi$, in a manner to be made conductive each for 1H time period in different timing sequence. Therefore, at the common connected output-terminal of the analog switches $39_\alpha, 39_\beta \ldots 39_\pi$, a stepwise rising output having 16 step voltage levels is obtainable. The stepwise output is taken out through an emitter follower 40, adjusted of amplitude by the variable resistor 41, amplified by a B-class amplifier 45 constituted by transistors 42, 43 and 44, and issued as the vertical deflection signal v through an output terminal 46. On the other hand, the vertical deflection signal v' is issued through the output terminal 46' in the similar manner, by switching the voltages of the potentiometer 38' by the analog switches $39'_\alpha, 39'_\beta \ldots 39'_\pi$. The vertical deflection signals v and v' are impressed to the upper vertical deflection electrodes 13', 13' ... and the lower vertical deflection electrodes 13, 13 ..., and thereby the electron beams from a line cathode is vertically deflected to have 16 vertical positions, thereby forming 16 horizontal lines on the phosphor screen 9.

Hereupon, in the circuit of FIG. 4, when mounting of the electrodes 13, 13' of the vertical deflecting means 4 is not accurate making them non-parallel each other, then the horizontal lines of the raster does not become in uniform pitches, accordingly for example making the brightness partly non-uniform. Such problem is easily dissolved when utilizing a digital type deflection driving circuit shown in and elucidated with reference to FIG. 5 and thereafter.

The image display apparatus in accordance with the present invention comprises circuit configuration suitable for interlace operation, wherein positions of scanning lines can be adjustable.

Figure 5:
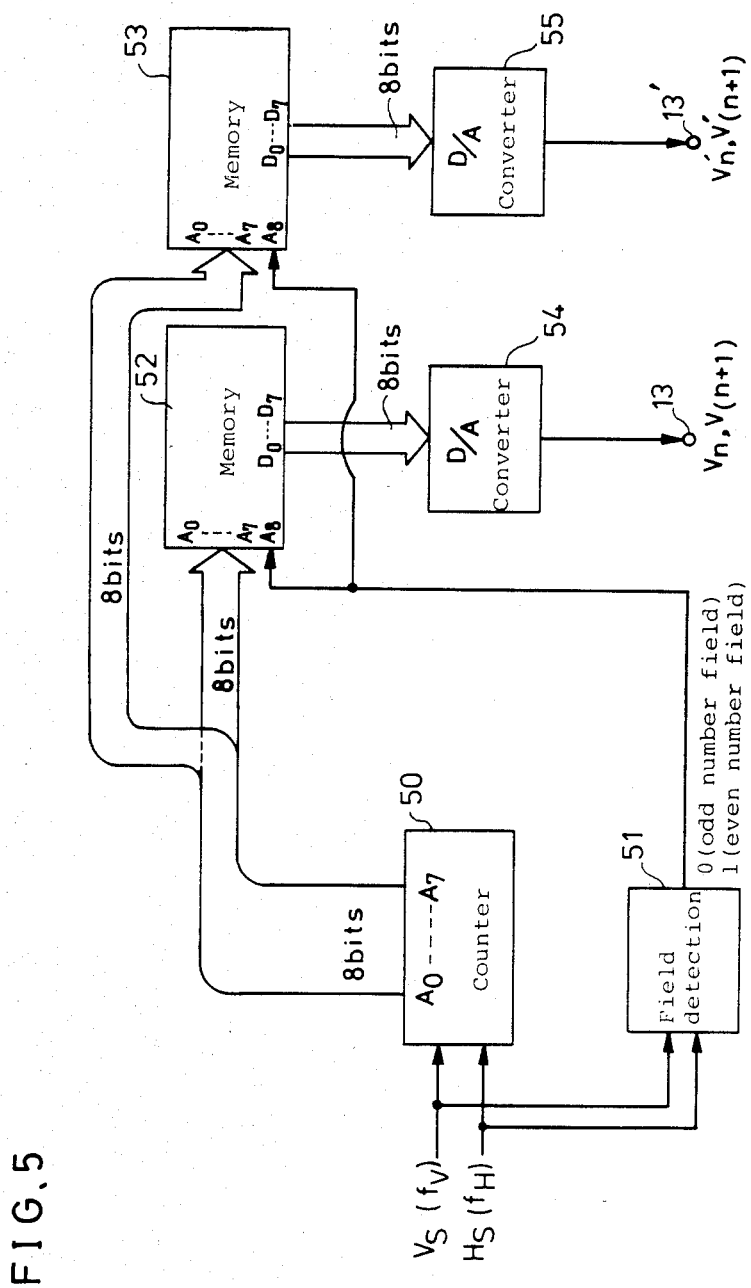
FIG. 5 is a block diagram of a principle example of vertical deflection driver 27 constituted in a digital circuit.

FIG. 5 is a block diagram showing an example embodying the present invention. The circuit has two memories 52 and 53, each being of 8 bits for data and 9 bits for addresses.

These memories can be of course provided on one single memory in different address parts. FIG. 6(A) shows a schematic expression of the memory wherein left part shows the first memory 52 and the right part shows the second memory 53. And in the memory the parts $V_n$ and $V_n'$ show data of vertical deflection signals for output terminal 13 and 13', respectively. Parts $V_{(n+1)}$, $V'_{(n+1)}$ show parts for the data for vertical deflection signal from the output terminal 13 and 13' in the next, that is, even number field, respectively. The actual data are shown in FIG. 6(B).

Figure 6:
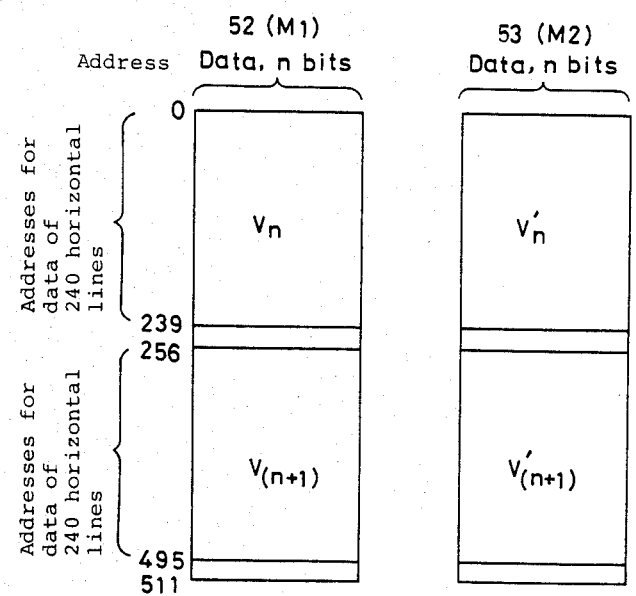
FIG. 6(A) is a schematic diagram showing a mode of a memory storing of data of vertical deflection signal.
FIG. 6(B) is a schematic diagram showing counter output for various horizontal lines.
Figure 6:
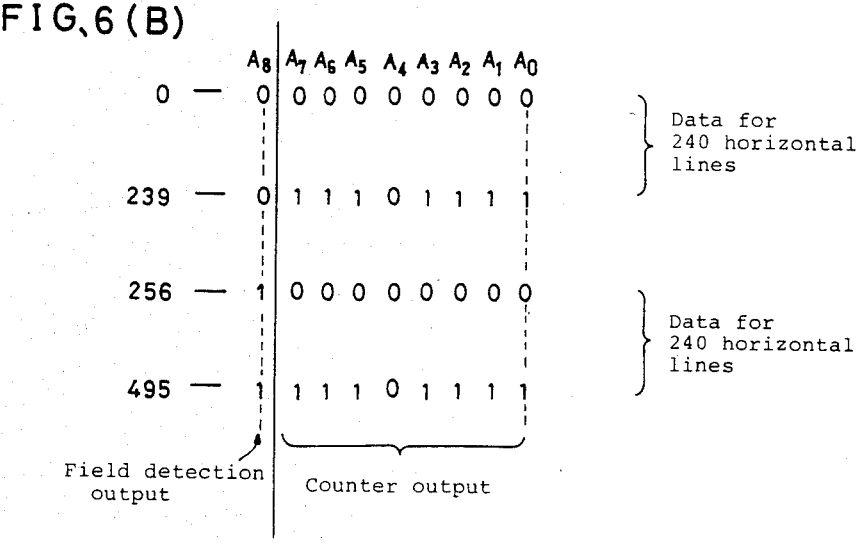

In FIG. 6, 8 bits data $A_0$ to $A_7$ are for the signals of vertical scanning of odd number field and even number field, and address $A_8$ is for data showing odd number or even number of the fields; for odd number field the data of address $A_8$ is 0 and for even number field the data of address $A_8$ are 1. The counter 50 is an up-counter, which is to be reset by a vertical synchronizing signal $V_S$ of frequency $f_V$ as shown in FIG. 7 and counts 240 pulses of horizontal synchronizing signal $H_S$ of frequency $f_H$. Parallel outputs of the counter 50 are given to address input terminals of a memory 52 and memory 53.

Field detection circuit 51 detects phase difference between the pulse of horizontal synchronizing signal $V_H$ of frequency $f_H$ and pulse of vertical synchronizing signal $V_S$ of frequency $f_V$ and issued field detection signal. In the odd number field, rise up edge of the pulse of the vertical synchronizing signal $V_S$ and corresponding rise up edge of the pulse of the horizontal sunchronizing signal $H_S$ are of the same phase relation as shown in FIG. 7(A), and in this case the field detection circuit 51 issues 0 output. On the other hand, for the even number field, the rise up edge of pulse of the vertical synchronizing signal $V_S$ and corresponding rise up edge of the pulse of the horizontal synchronizing signal $H_S$ are making phase difference of half cycle of the horizontal synchronizing signal as shown in FIG. 7(B), and in this case the field detection circuit 51 issues 1 output.

Figure 8B:
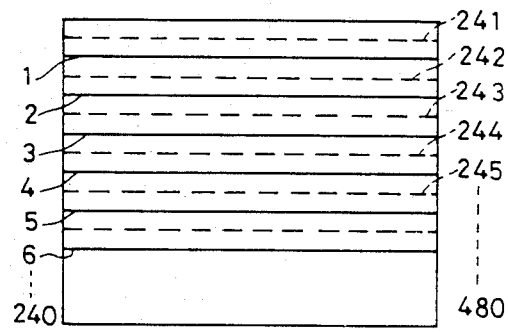
FIG. 8(B) is a schematic view of a raster to illustrate interlacing.

By this output signal of the field detection circuit 51, in the odd number fields address "0" to "239" in the memories 52 and 53 are accessed thereby the memories 52 and 53 reading out data of vertical deflection signals $V_n$ and $V_n'$, respectively. On the other hand in the even number fields, the addressed 256 to 495 are accessed in the memories 52 and 53, thereby reading out data of the vertical deflection signals $V_{(n+1)}$, $V'_{(n+1)}$. These read out data are given to the D/A converters 54 and 55, respectively, and vertical deflection signals $V_n$, $V_{(n+1)}$ and $V_n'$, $V'_{(n+1)}$ are issued. As shown by FIG. 8(A), the outputs $V_n$ and $V_{(n+1)}$ are signals of positive gradation and the signal $V_n'$ and $V'_{(n+1)}$ are signals of negative gradation; and the outputs $V_n$ and $V_n'$ are for odd number fields and the outputs $V_{(n+1)}$ and $V'_{(n+1)}$ are for even number fields. And as shown in FIG. 8(B), in the first field of a frame, lines No. 1 to No. 240 scans and in the next field, at a position inbetween the above-mentioned horizontal scanning lines No. 241 to No. 480 lines scans, thereby making interlacing.

The data of the memories 52 and 53 can be rewrited, and by inputting data corresponding to an appropriate position of horizontal lines, adjustment of the position of the horizontal lines can be easily made.

The present invention is superior in accuracy of interlacing and easiness of adjusting of the horizontal scanning lines, since the data of vertical deflection signal is given as a digital data and can be easily adjusted by means of microcomputer. Accordingly a high vertical resolution is assured.

Figure 9:
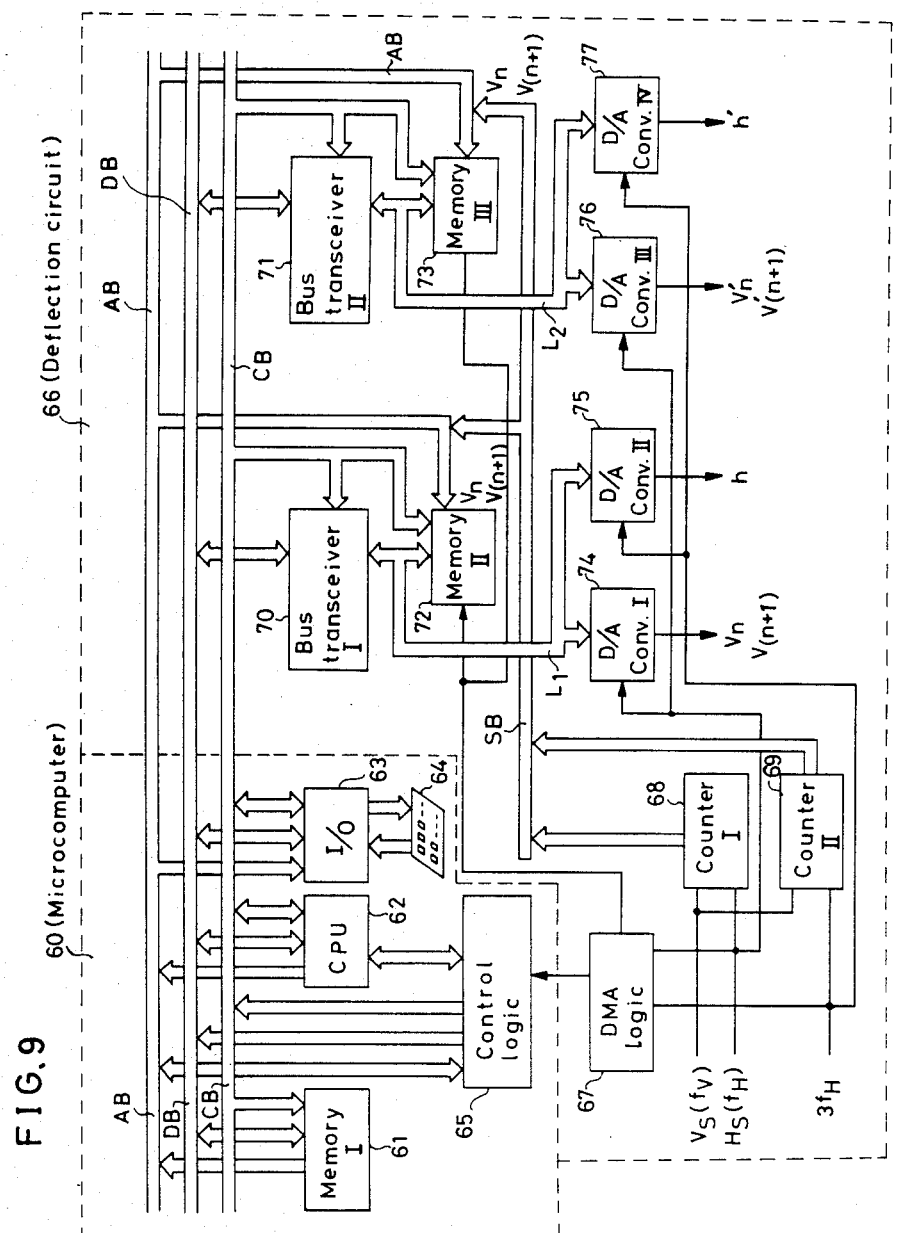
FIG. 9 is a block diagram of an actual example of a vertical deflection driver and a horizontal deflection driver combined therewith and utilizing a microcomputer therein, of the present invention.

An actual example of adjusting the data of the vertical deflection signal in the memory is elucidated with reference to FIG. 9.

In FIG. 9, a part 60 designates a microcomputer comprising a CPU 62, an I/O port 63, a first memory 61, a control logic circuit 65 and an input key board 64. In this example, the microcomputer 60 is an 8 bit microcomputer. Another part 66 is a part for generating vertical deflection signal and horizontal deflection signal, and is connected to the microcomputer part 60 by means of address bus AB, data bus DB and control bus CB. The data bus DB and control bus are connected to bus transceivers 70 and 71 which are further connected to a second memory 72 and a third memory 73, respectively. The second memory 72 and the third memory 73 are storing digital data of vertical deflection signal and horizontal deflection signal, respectively. A first D/A converter 74 and a second D/A converter 75 are for producing vertical deflection signal and horizontal deflection signal through D/A conversion of the data in the second memory 72, and a third D/A converter 76 and a fourth D/A converter 77 are for producing vertical deflection signal and horizontal deflection signal through conversion of the data from the third memory 73, respectively. These D/A converters are provided with latch function. A first counter 68 is a presettable counter which counts pulses of horizontal synchronizing signal $H_S$ and is reset by a pulse of vertical synchronizing signal $V_S$. A second counter 69 is also a presettable counter and counts a pulse train which has a $3f_H$ frequency which is three times of the frequency $f_H$ of the horizontal synchronizing signal $H_S$ and is reset by rise up edge of a pulse of vertical synchronizing signal.

Figure 10:
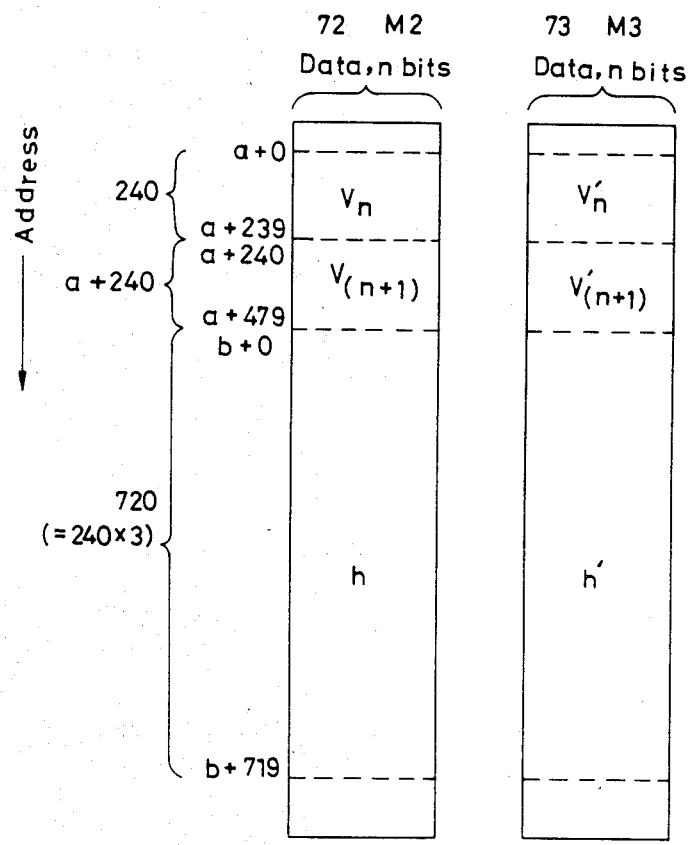
FIG. 10 is a schematic diagram showing mode of a memory storing of data of vertical deflection signal and horizontal deflection signal.

A DMA logic circuit 67 makes a direct memory accessing thereby to stop the microcomputer 60 and makes the second memory 72 and the third memory 73 issue digital data for vertical deflection and horizontal deflection to be given to the D/A converters 74, 75, 76 and 77. A field detection circuit corresponding to the circuit 51 of FIG. 5 is included in the DMA logic circuit 67. When desired the data in the second memory 72 and the third memory 73 can be rewritten by means of the microcomputer 60. In the actual apparatus, the second memory 72 and the third memory 73 are allotted with the data area as shown in FIG. 10. That is, in the second memory 72 and in the third memory 73, data areas for data of vertical deflection signals $V_n$ and $V_n'$ as well as $V_{(n+1)}$ and $V'_{(n+1)}$ are allotted in the address of from a to a+239 and from a+240 to a+479, respectively and the data for the sequence of the vertical deflection signals are stored in sequence in the above-mentioned addresses. As for the horizontal deflection signal, the data areas in the memory are allotted as shown in FIG. 10, in an address from b to b+719 provided that 240 electron beams are to be horizontally deflected into three positions each. And the data of the horizontal scannings are stored in sequence in that data area.

Figure 11A:
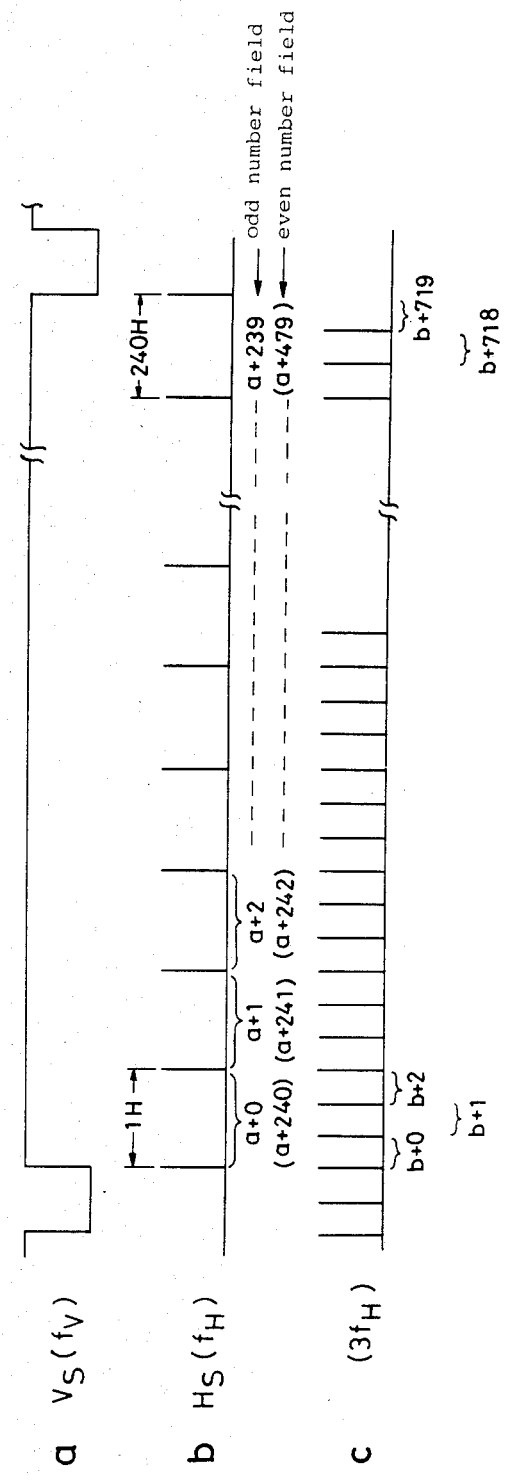

FIG. 11 is a time chart explaining the operation of the first counter 68 and the second counter 69. Therein the first counter 68 is reset by a pulse of vertical synchronizing signal $V_S$ and counts the pulses of horizontal synchronizing signal $H_S$ and issues digital output. This counter 68 is a presettable counter and counts 240 pulses of horizontal synchronizing signal. The counter 68 includes a field detection circuit which corresponds to 51 of FIG. 5, and therefore, the output of this counter 68 includes the output of the field detection circuit 51 elucidated in FIG. 5, and also includes address signal for accessing the addresses of from a to a+239 when the odd number field is selected by the output signal 0 of the field detection circuit 51, and accesses the addresses from a+240 to a+479 when an even number field is selected by the above-mentioned field selection signal of 1 from the field detection circuit 51.

On the other hand, the second counter 69 counts the pulse train having $3f_H$ frequency, namely three times of frequency $f_H$ of the horizontal synchronizing signal $H_S$ and counts a preset value from b to b+719. The pulse train is produced by known triple-multiplication circuit. This second counter 69 is also a presettable counter and therefore issues the output address access signal of from b to b+719. The outputs of the first counter 68 and of the second counter 69 are fed to the address bus AB of the microcomputer 60.

Figure 13:
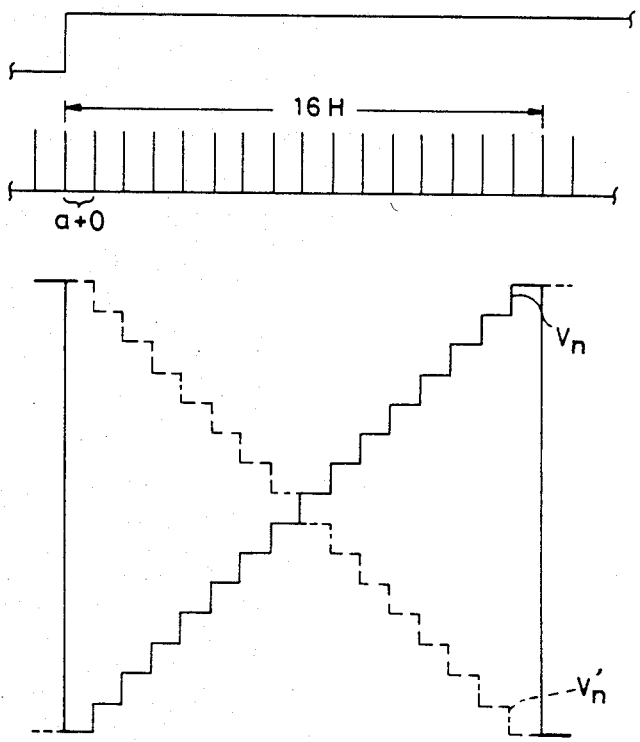

FIG. 12 is a time chart for explaining operation of the microcomputer 60 and the deflection circuit 66. In FIG. 12, waveform "a" designates a vertical synchronizing signal $f_V$, waveform "b" designates horizontal synchronizing signal $f_H$, waveform "c" designates the pulse train having frequency as high as three times the frequency $f_H$ of the horizontal synchronizing signal $H_S$. Waveform "d" designates output signal of the DMA logic circuit 67, that is AND signal of the waveform "b" and the waveform "c" to be given to the control logic circuit 65 to control the microcomputer 60. The control is in such a manner that the microcomputer 60 becomes in operation state at "0" state of the output of the DMA logic 67; so that the data of the second memory 72 and the third memory 73 can be adjusted during the operation state. The rewriting is made by feeding control signals to the second memory 72 and 73 from the microcomputer 60 through a control bus CB and through bus transceivers 70 and 71. Waveform "e" designates signal on the address bus AB, wherein during the period of "1" level of the horizontal synchronizing signal $H_S$, output signal from the counter 68 is introduced, and during the "1" level of the pulse in the triple-multiples signal of waveform "c", output of the counter 69 is introduced both through a sub-address bus SB. In the waveform "e", the hatched parts show the state where microcomputer 60 is on and white part show data, wherein address accessed by control of the microcomputer 60 is selectively given to the memories 72, 73. Waveform "f" shows state of the data bus DB from the microcomputer 60, wherein only during ON-state of the microcomputer 60, the data on the addresses selected by means of the microcomputer 60 is read out. Waveform "G" shows signal on the data bus line $L_1$, from the second memory 72, on which, when the odd number field is selected and at "1" level of the horizontal synchronizing signal $H_S$, data $D_{v0}$ to $D_{v239}$ stored in the addresses of a+1 to a+239 of the second memory 72 are read out. These data are read out from the second memory 72 and is fed to the D/A converter 74 and latched for one horizontal synchronizing signal $H_S$, thereby to produce the vertical deflection signal $V_n$ as shown in FIG. 13.

Figure 14:
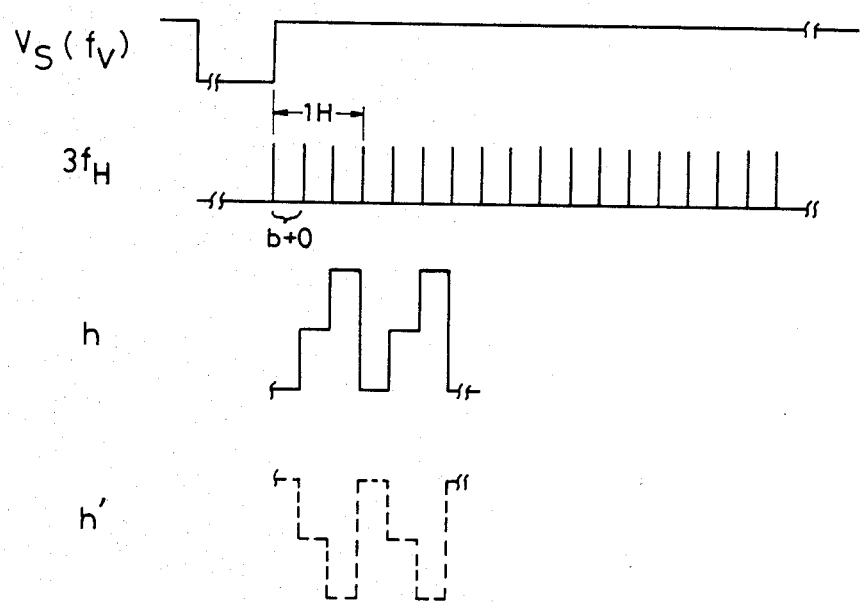

When the triple-multiplied frequency pulse train ($3f_H$)is at "1" level, by accessing the addresses b+0 to b+719, data $D_{h0}$ to $D_{h719}$ are read out from the second memory 72 to the second D/A converter 75 and latched there for the time period of the three cycles of the horizontal synchronizing signal by means of the triple-multiplied pulse train signal, and a horizontal signal h as shown in FIG. 14 is obtainable.

Waveform "H" shows signal on the data line $L_2$ from the third memory 73, on which when the even number field is selected at H level of the horizontal synchronizing signal $H_S$, data $D_{v0}'$ to $D_{v239}'$ stored in the addresses of from a+0 to a+239 are read out. These data are read out from the third memory 73 and is fed to the D/A converter 76 and latched for one horizontal synchronization pulse, thereby to produce the vertical deflection signal $V_n'$ as shown in FIG. 13.

When the triple-multiplied. frequency pulse train of $3f_H$ frequency is at "1" level, by accessing the addresses b+0 to b+719, data $D_{h0}'$ to $D_{h719}'$ are read out from the third memory 73 to the fourth D/A converter 77 and latched there for the time period of the three cycles of the horizontal synchronizing signal $H_S$ by means of the triple-multiplied pulse train signal, and a horizontal synchronizing signal as shown in FIG. 14 is obtainable.

On the contrary to the above-mentioned operation for the odd number field with respect to the memories 72 and 73, the operation for the even number field is as follows. During the period of "1" level of the horizontal synchronizing signal $H_S$, address signals for the addresses of a+240 to a+479 are read out to the address bus AB, thereby making the second memory 72 and the third memory 73 to issue data of the vertical scanning pulse for their even number field to the D/A converters 74 and 76, and thereby making the D/A converters to issue the vertical deflection signals $V_{(n+1)}$, $V'_{(n+1)}$ as shown in FIG. 8, respectively, thereby an interlacing is carried out.

Presetting and adjusting of the data in the second memory 72 and the third memory 73 can be made during the operation state of the microcomputer 60 by feeding controlling pulse from the microcomputer 60 through data bus and control bus to the bus transceivers 70 and 71 which is made ON during the period of operation of the microcomputer. When the microcomputer 60 is in the stop state, the bus transceivers 70 and 71 are made off.

Figure 15A:
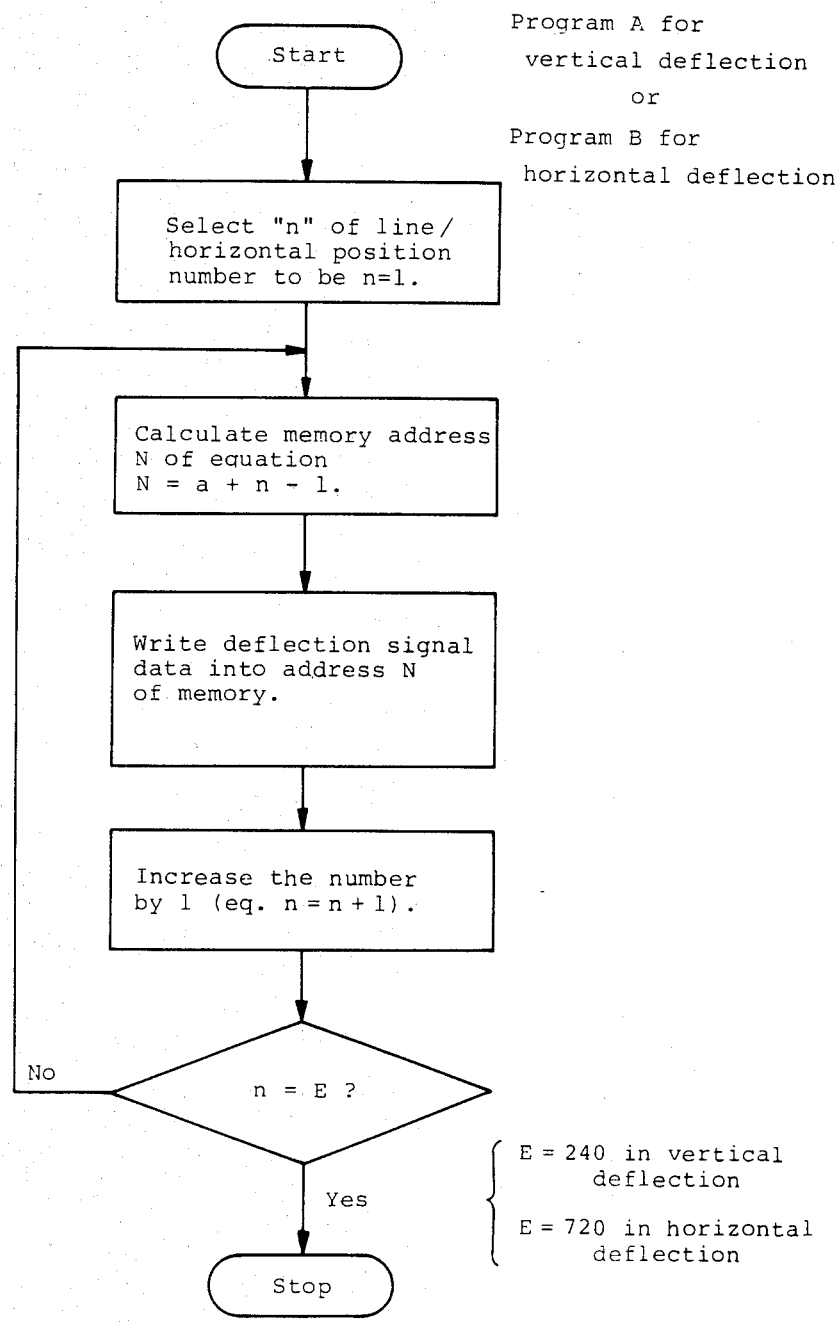
FIG. 15(A) is a flow chart of presetting initial data into the memory by using the microcomputer.
Figure 15B:
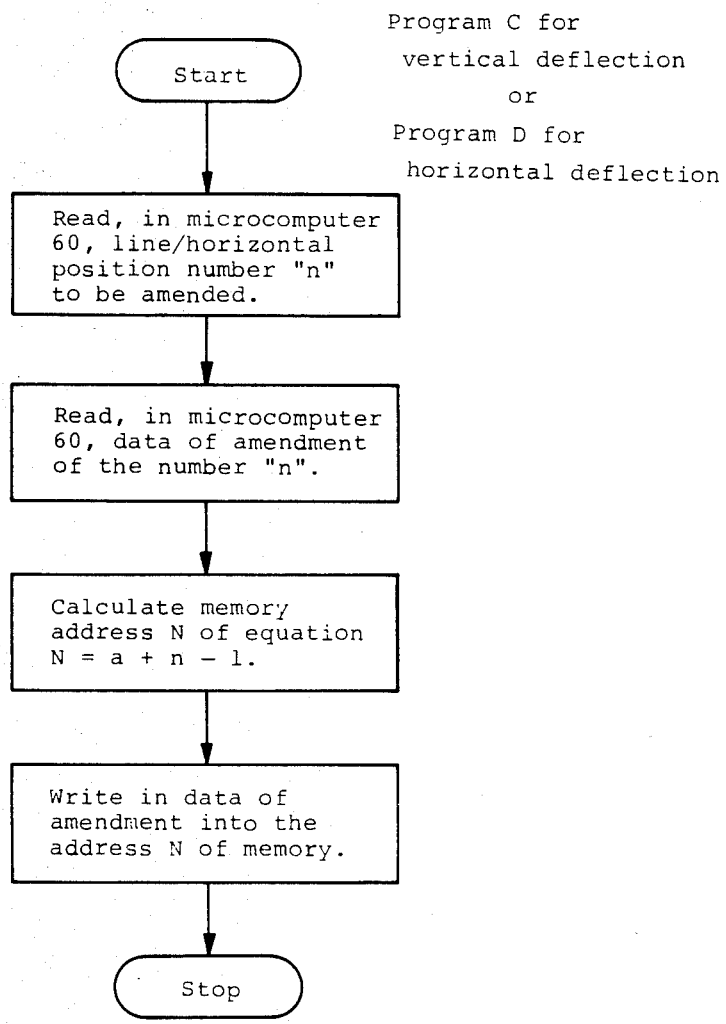
FIG. 15(B) is a flow chart of adjusting the initial data by using the microcomputer.

Now, CPU process is elucidated referring to FIG. 15(A) and FIG. 15(B) which are flow charts for presetting and for adjusting the second memory 72 and the third memory 73, respectively, together with FIG. 9.

First microcomputer 60 is made to ON state. Then initial value data of the vertical deflection signal is preset in the memory. This is done by operating key board 64 and make a program A shown in FIG. 15(A) for vertical deflection signal stored in a first memory 61 start through I/O 63, thereby reading out the preset data from the microcomputer 60 through the bus-transceivers 70 and 71 into the second memory 72 and the third memory 73, respectively, and write the read-out preset data of the vertical deflection signal into the area for the vertical deflection data parts. In the above operation the value E is set to be 240.

In actual process for the adjustment of the vertical deflection signal data, similar adjustment processes are made for the data areas of $V_n$, $V_n'$, $V_{(n+1)}$ and $V'_{(n+1)}$ of FIG. 10.

For the next step, initial value setting of data of horizontal deflection signal is made. This is done by operating the key board 64 and make a program B shown in FIG. 15(A) for horizontal deflection signal stored in the memory 61 starts through I/O circuit 63, thereby reading out the preset data of horizontal deflection signal from the microcomputer and write the read out preset data into the second memory 72 and the third memory 73 through bus-transceivers 70 and 71, respectively. In the actual process for adjustment of the horizontal deflection signal data, similar adjustment processes are made for the data areas of h and h' of FIG. 10.

Then, by observing the picture, the quality of the picture is examined. If there is some need of amending the vertical scanning or the like, the amending or the adjusting of the data stored in the memories can be made as follows. By operating the key board 64, a program C shown in FIG. 15(B) stored in the first memory 61 is made start through the I/O 63, then nextly by operating the key 64, the data in the second memory 72 or the third memory 73 corresponding to the vertical deflection signal data is rewritten to increase or to decrease as necessitated for the adjustment. That is, the adjustment is made by adjusting the positions of 480 horizontal lines in the vertical direction through microcomputer 60.

On the other hand, adjustment of the deflection position in the horizontal direction is made in the next step. That is, the adjustment of the data is made by operating the key board 64, taking a program D shown in FIG. 15(B) stored in the first memory 61 through the I/O 63, then operating the key board 64 to access the addresses to be adjusted in the second memory 72 and the third memory 73 and re-writing the data to increase or to decrease, thereby adjustment of data line by line can be made. The adjustment of the deflection position in the horizontal direction can be made with respect to 720 positions, (i.e., 3(horizontal positions)×240(number of picture elements) positions) arbitrarily through the operation of the microcomputer 60. When the above-mentioned adjustments of vertical deflection and horizontal deflection are made by utilizing the program C and program D, the picture is again examined, and when necessary, further adjustment may be made in the similar way. As has been elucidated, adjustment of the vertical deflection and horizontal deflection are easily made by utilizing the microcomputer 60, accordingly the adjustment can be made very accurately, and the interlace scanning becomes accurate, ensuring good picture quality.

What is claimed is:

1. A display apparatus comprising:
   a phosphor screen comprising a first predetermined number of horizontally divided sections,
   a second predetermined number of electron beam sources for in-turn emitting said second predetermined number of horizontal rows of electron beams, each row having said first predetermined number of electron beams, producing one horizontal line on said screen,
   horizontal deflection means for selective impingements of said electron beams on regions of in-turn selected corresponding positions of said horizontally divided sections at one time,
   vertical deflection means for vertically deflecting said electron beams in such a manner that electron beams of a horizontal row impinges said phosphor screen in one vertically divided segment which is corresponding to said one horizontal row, thereby vertically moving said one horizontal line in said vertically divided segment,
   electron beam control means for simultaneous controlling of intensities of respective electron beams responding to image signal to produce a line-at-a-time displaying of video picture,
   a flat shaped vacuum enclosure containing said above-mentioned components therein, one end face thereof forming a screen face in which said phosphor screen is provided,
   wherein
   said horizontal deflection means and said vertical deflection means comprises:
   digital memory means which stores data of digital deflection signals for deflections of said electron beam,
   D/A converters for converting said data of digital deflection signals into analog signals, and
   address counters for controlling said digital memory means,
   said digital memory means comprising first memory means which stores data of said digital deflection signals for odd number field and second memory means which stores data of said digital deflection signals for even number field,
   said address counters, issuing different address signals for odd number field and even number field, thereby to make accessing in said first memory means and said second memory means for said odd number field and said even number field, respectively.

2. A display apparatus in accordance with claim 1, which further comprises a microcomputer for carrying out adjustment of data of deflection signal stored in said memory.

3. A display apparatus in accordance with claim 2, wherein
   said address counters receive horizontal synchronizing signal as input data signal, and issues address signals to said digital memory means for making the digital memory means read out data for deflection signals to said D/A converters.

4. A display apparatus in accordance with claim 2, wherein
   said address counters receive a pulse train signal produced by frequency multiplication of horizontal synchronizing signal as input data signal, and issues address signals to said digital memory means for making the digital memory means read out data for deflection signals to said D/A converters.

* * * * *